April 12, 1955 C. A. MAGARY 2,705,966
CABIN
Filed Sept. 25, 1950 5 Sheets-Sheet 2
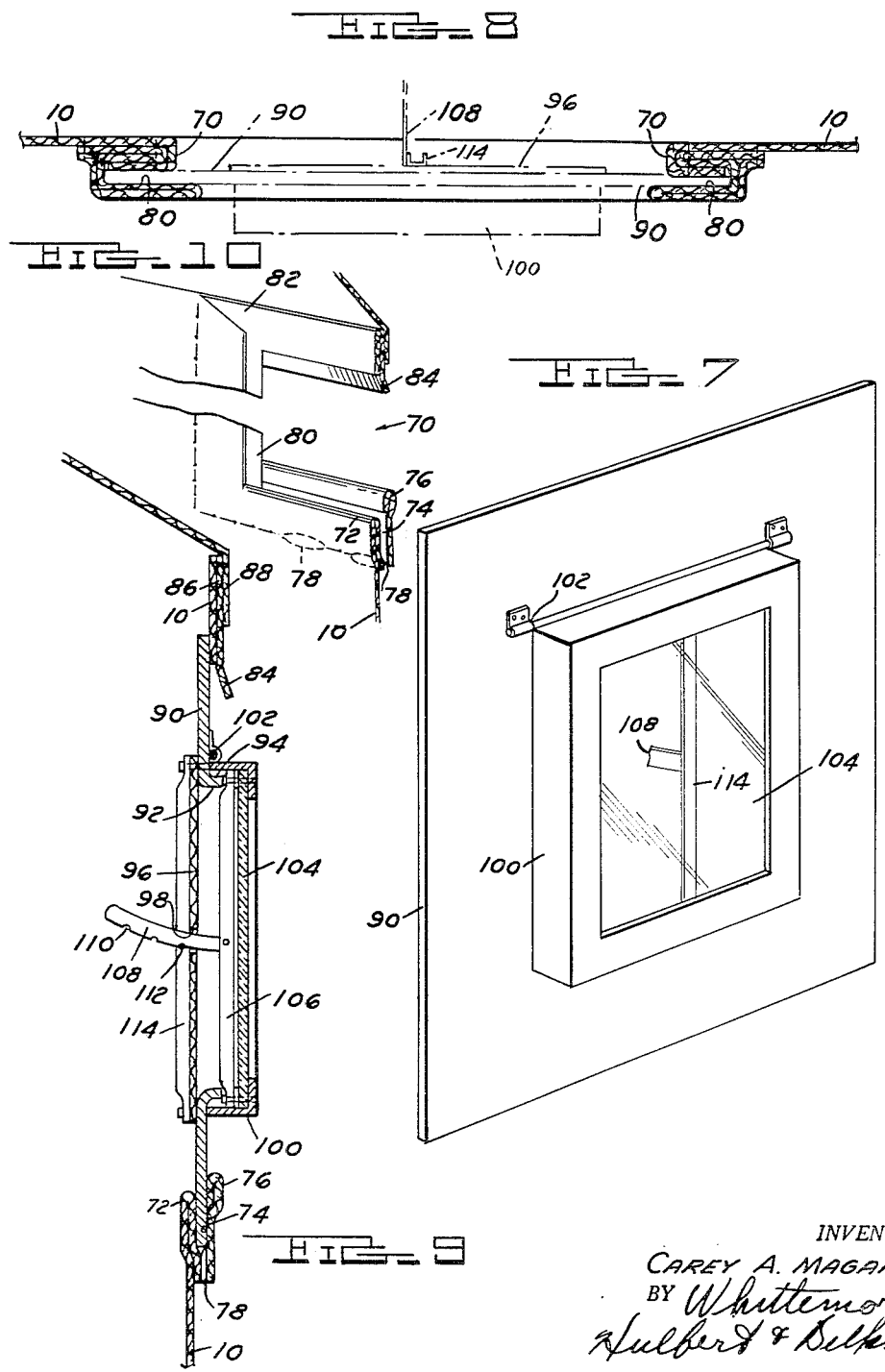
INVENTOR.
CAREY A. MAGARY
BY Whittemore,
Hulbert & Belknap
ATTORNEYS April 12, 1955        C. A. MAGARY        2,705,966
CABIN
Filed Sept. 25, 1950        5 Sheets-Sheet 3
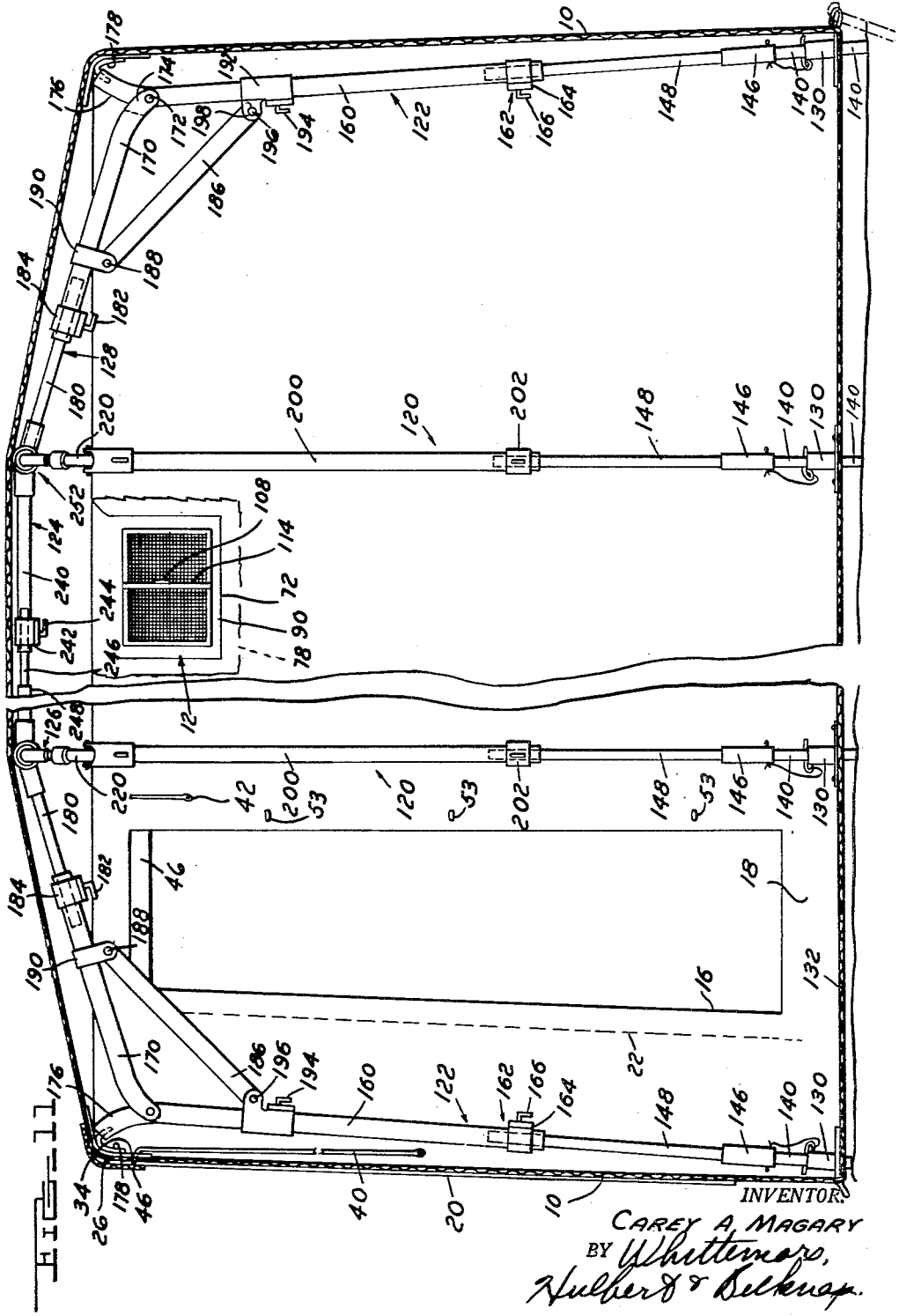
INVENTOR
CAREY A. MAGARY
BY Whittemore,
Hulbert & Belknap.
ATTORNEYS

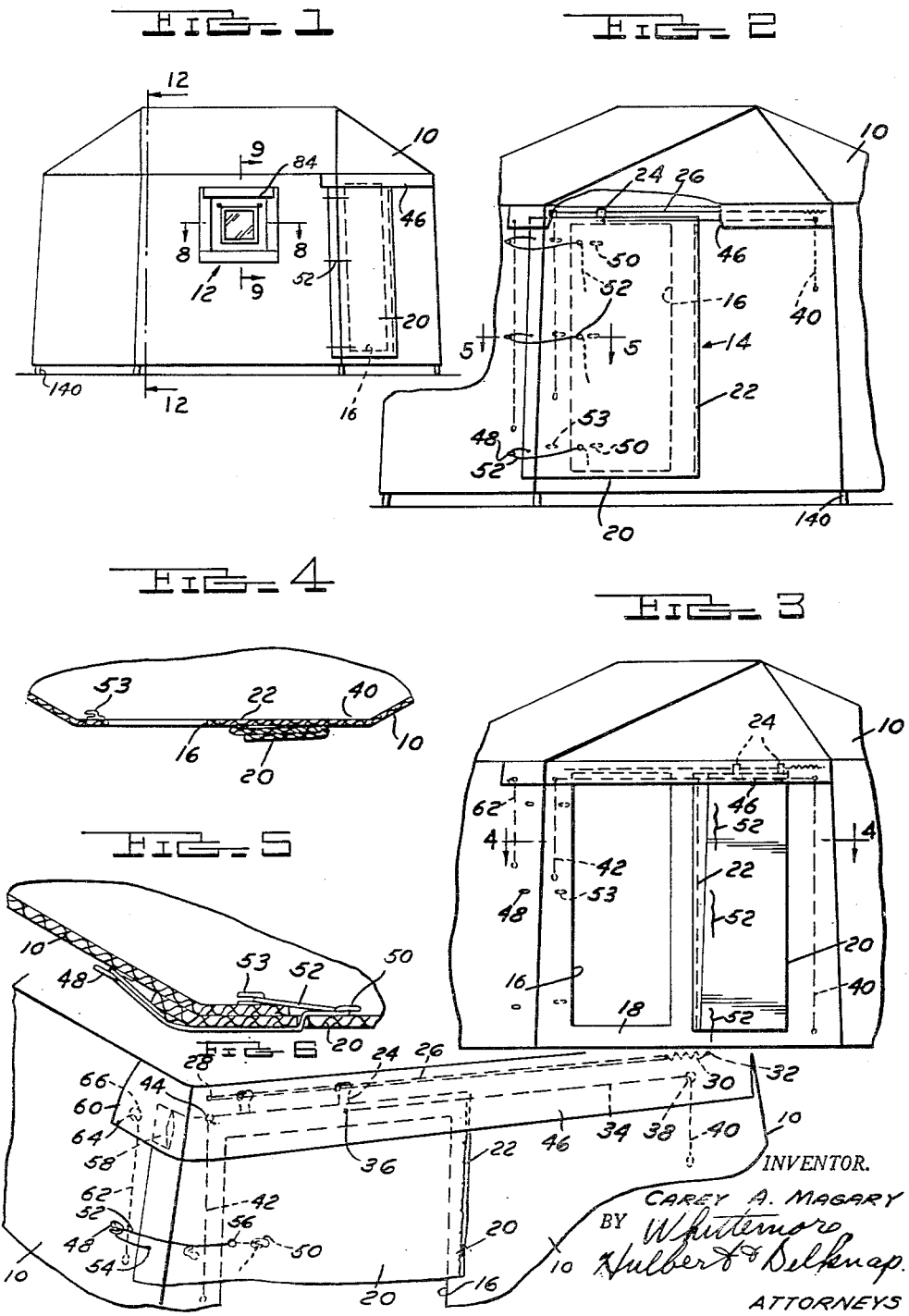

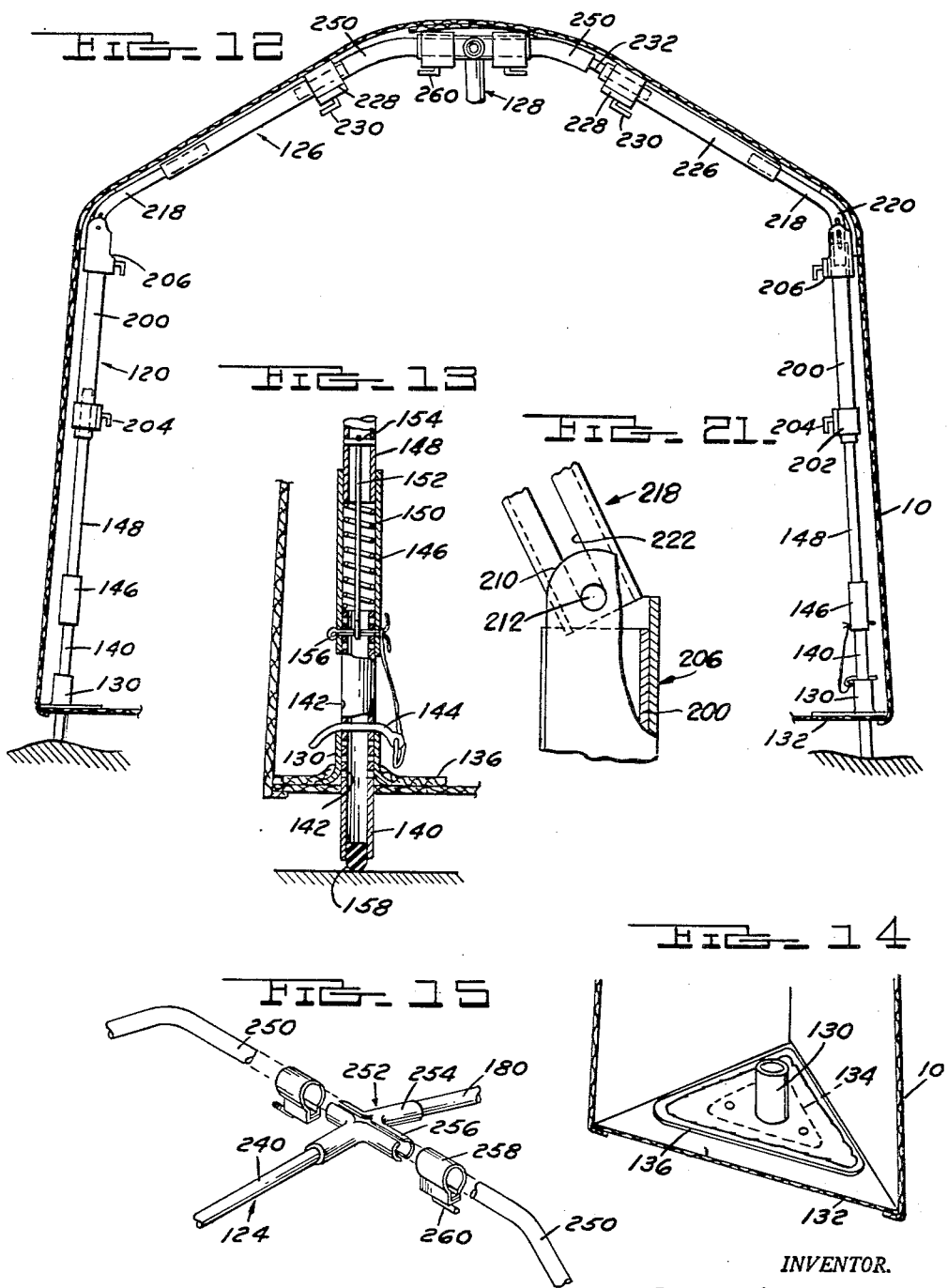

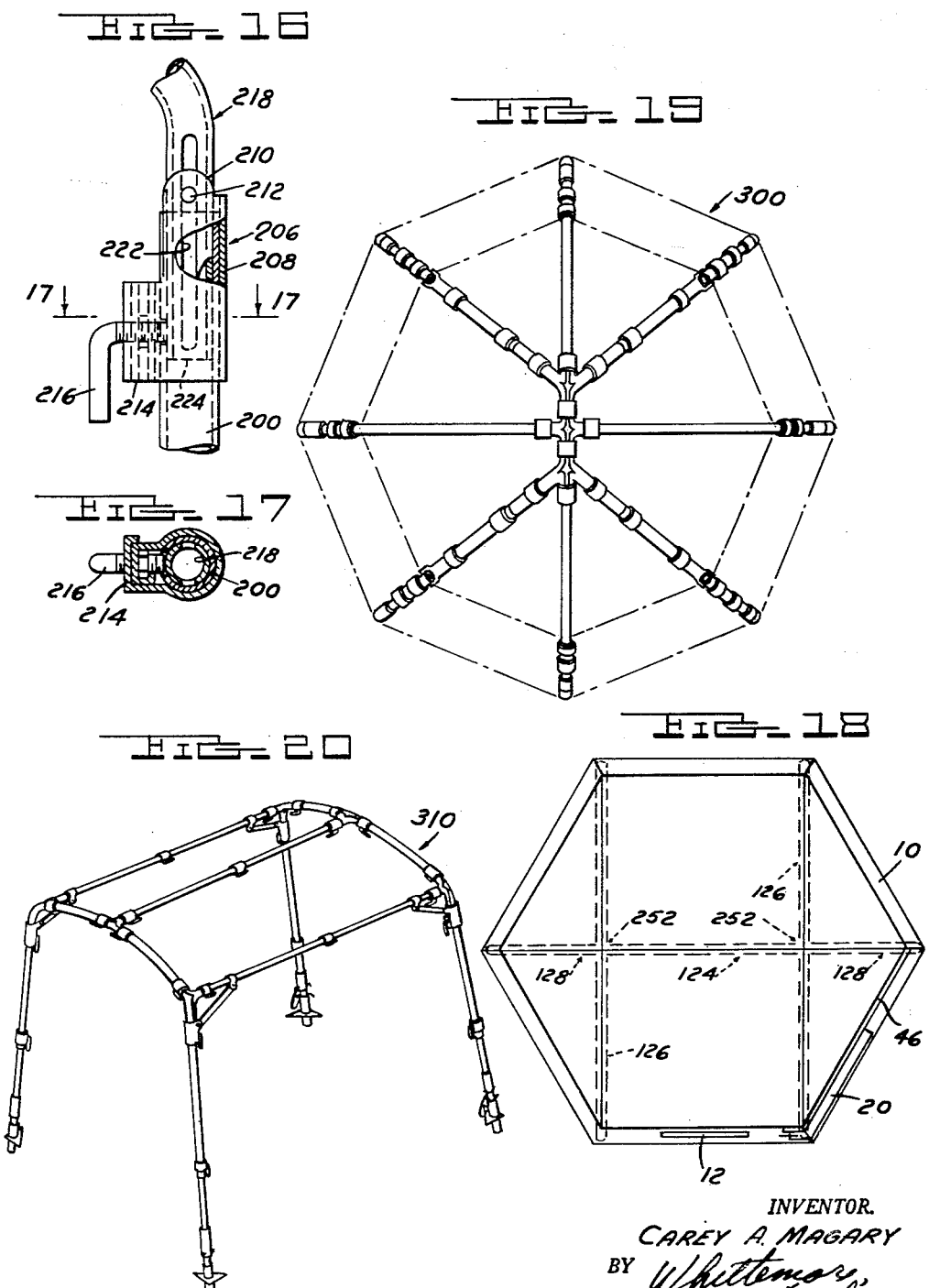

United States Patent Office 2,705,966
Patented Apr. 12, 1955

2,705,966
CABIN

Carey A. Magary, St. Clair, Mich.

Application September 25, 1950, Serial No. 186,578

12 Claims. (Cl. 135—1)

The present invention relates to a cabin and more particularly to a structure comprising a supporting framework composed generally of adjustable, interconnected tubular elements extending in crossing relation to one another and a fabric covering therefor. I refer to this article as a cabin rather than as a tent because of the fact that the assembled structure is substantially rigid and self-sustaining and can be moved from place to place if desired without disassembly.

It is an object of the present invention to provide a cabin comprising a fabric enclosure including a floor, side walls, and a top covering in association with an expandable rigid framework adapted to be expanded within the fabric enclosure so as to tension the enclosure, whereby rigidity is imparted to the framework in part by the fabric structure and the fabric structure is sustained in expanded relation by the adjustable supporting framework.

It is a further object of the present invention to provide a cabin of the character described, characterized by its lightness, the economy with which it may be produced, the ease with which it may be assembled and disassembled, the compactness with which the component elements may be packed for storage or transport, and the efficiency of the structure in operation.

It is a feature of the present invention to provide a cabin of the character described having a framework characterized by the fact that the elements thereof are generally tubular elements with provision for telescoping so as to reduce the space required for storage or transport of the disassembled cabin.

It is a further feature of the present invention to provide a framework characterized by the ease with which it may be erected, and its rigidity in erected condition.

It is a further feature of the present invention to provide a door closure member for the cabin adapted to be closed and retained in weather-tight condition from the inside of the structure.

It is a further feature of the present invention to provide a removable window structure for the cabin.

Other objects and features of the invention will become apparent as the description proceeds, especially when taken in conjunction with the accompanying drawings, wherein:

Figure 1 is a front elevation of the assembled cabin.

Figure 2 is an enlarged fragmentary front elevation with parts broken away illustrating the door closure construction.

Figure 3 is a view to Figure 2 showing the door flap in open position.

Figure 4 is a fragmentary section on the line 4—4, Figure 3.

Figure 5 is an enlarged fragmentary section on the line 5—5, Figure 2.

Figure 6 is an enlarged fragmentary perspective view illustrating further details of the door flap mounting.

Figure 7 is a perspective view of a removable window element for use with the cabin.

Figure 8 is an enlarged fragmentary section on the line 8—8, Figure 1.

Figure 9 is an enlarged fragmentary section on the line 9—9, Figure 1.

Figure 10 is a fragmentary perspective view illustrating the window supporting structure.

Figure 11 is a vertical longitudinal section through the assembled cabin.

Figure 12 is a vertical transverse section through the cabin structure illustrated in Figure 11.

Figure 13 is a fragmentary section through the lower end of a side post and associated structure.

Figure 14 is a fragmentary perspective view partly in section showing a receptor station located at the interior corners of the structure.

Figure 15 is a fragmentary exploded perspective view illustrating the interconnection between ridge and rafter members.

Figure 16 is a fragmentary elevation partly in section illustrating the hinged brace post construction.

Figure 17 is a section on the line 17—17, Figure 16.

Figure 18 is a plan view of the assembled cabin.

Figure 19 is a plan view of the framework for a modified form of cabin.

Figure 20 is a perspective view of the framework for yet another modified form of cabin.

Figure 21 shows the hinged post construction of Figure 16, but in another position.

Referring now to Figures 1 through 6 and 20 the form of cabin chosen for specific illustration is of generally rectangular shape provided with pointed ends, thus giving the overall cabin structure a hexagonal cross-section. As seen in the figures, the cabin comprises a fabric enclosure 10 which may be of canvas or other material suitable for the purpose. One side wall of the cabin includes a window structure indicated generally at 12 and an adjacent side thereof includes a door structure indicated generally at 14.

The door structure will first be described and for this description, attention is directed particularly to Figures 2 through 6. As seen in Figure 3, the side wall of the fabric enclosure is provided with a door opening 16 which preferably does not extend completely to the bottom of the side wall and leaves a fabric sill portion 18.

A door flap 20 is provided which is sewed along one edge as indicated at 22 to a side wall of the fabric enclosure. The remaining three edges of the door flap 20 are free for movement relative to the enclosure structure.

In order to support and guide the door flap 20 for opening and closing movement, its upper edge is provided with a plurality of ferrules 24 which are mounted on an elongated supporting element such as a wire 26. Preferably, the wire 26 is rigidly secured to a side of the wall as indicated at 28 and its other end is resiliently connected to the side of the structure as by a coil tension spring 30 secured at one end to the wire 26, and at its opposite end to the side of the structure as indicated at 32. Means for effecting sliding movement of the door flap between open and partially closed position is provided and comprises a drawstring 34 secured at one end as indicated at 36 to a mid-portion of the door flap 20 and extending through a grommet or opening 38 provided in the side wall of the enclosure to the interior thereof. This provides a depending portion of the drawstring 40 at the interior of the enclosure by means of which the user may draw the door to fully open position. It will be appreciated that since the point 36 of connection between the drawstring 34 and the door flap is located centrally of the door flap, and since the right hand edge of the door flap (as indicated in Figure 6) is sewed or otherwise secured to the side wall 10 of the enclosure, that full movement of the drawstring 34 to the right will fully expose the door opening 16. This position of the door flap 20 is illustrated in Figure 3.

In order to move the door flap to its fully closed position a second drawstring 42 is provided which is secured adjacent the upper corner of the door flap 20, and at its free edge the drawstring 42 likewise is led to the interior of the construction through a grommet or the like indicated at 44 in Figure 6. It will thus be apparent that the door flap may be moved between fully open and fully closed position by alternate actuation of the drawstrings 34 and 42.

In order to prevent moisture entering along the upper edge of the door flap the enclosure structure of the cabin is provided with a depending protective eave 46 which may be sewed or otherwise secured along its upper edge to the enclosure structure and which, as indicated best in Figure 6, extends around a corner of the enclosure. The arrangement is such that the upper edge of the door flap 20 in its opening and closing movement underlies the eave flap 46 and thus entrance of moisture is effectively prevented.

In order to provide for a weather-tight closure of the door flap when in closed condition, the following special arrangements are provided. One or more sets of hooks 48 and 50 are provided. The hooks 48 are located at the exterior of the enclosure structure around the corner from the door opening 16. The hooks 50 are located on the inside of the door flap 20 directly adjacent the door opening 16. A closure cord 52 is provided which is secured to the outside of the door flap 20 as indicated at 54 and thence passes through an opening or grommet 56 in the door flap 20. In use an occupant of the cabin extends his hand to the exterior and grasps the cord 52. He then forms a loop in the cord and places the loop therein over the hook 48. Thereafter, the cord 52 is tensioned from the inside of the cabin and is led around the hook 50 and may be secured to a third hook 53 located on the interior of the wall structure of the enclosure adjacent the opening 16 therein. Due to the fact that the edge of the door flap is thus positioned around the corner from its major extent, a very efficient weather-tight seal is produced.

Preferably, the upper free corner of the door flap 20 is provided with a finger pocket 58. The occupant of the cabin may extend his hand through the door opening 16 into the finger pocket 58 and thus draw the finger pocket around the corner of the structure and tuck it under the depending eave 46.

In order to close down the corner portion 60 of the eave 46 after the free top corner of the door flap 20 has been properly positioned, a drawstring 62 is provided which is secured to the corner of the eave as indicated at 64 and which extends through an opening or grommet 66 to the interior of the structure. Thus after the door has been drawn to closed position and the top corner of the door flap has been positioned around the corner and tucked in under the eave 46, the eave may be tightened down to improve the weather-tight seal thus provided by pulling on the drawstring 62.

Preferably, the enclosure is provided with a window indicated generally at 12 in Figure 1. Details of this construction are illustrated in Figures 7 through 10. As seen in these figures, the side wall of the fabric enclosure 10 is provided with a window opening 70. The material of the fabric side wall is reversely folded as indicated at 72, from which point it extends downwardly and thence upwardly to provide an upwardly open channel 74. The free edge of the fabric at the outside of the cabin structure is preferably thence reversely folded as indicated at 76 and sewed or otherwise secured in position. Drainage openings 78 are provided at the bottom of the channel 74 thus produced. At the sides of the window opening 70 guide channels 80 are provided which are open at the top as indicated at 82. These channels may be provided by sewing additional strips of canvas in proper position, or if preferred they may be formed by suitably cutting and sewing the material adjacent the edges of the window opening 70. At the top of the window opening 70 an outwardly extending eave 84 is provided from the fabric of the enclosure or from an additional piece of fabric sewed or otherwise suitably secured thereto. As best seen in Figure 9, the eave 84 is illustrated as formed by a separate strip of fabric 86 sewed or otherwise suitably secured between the fabric of the side wall 10 and a separate fabric 88 forming the roof or top of the enclosure structure.

Removably mounted in the bottom channel 74 and the side guide slots 82 is a window construction best seen in Figures 7 and 9. This window construction comprises a plate 90 which may be formed of metal or the like. Centrally of the plate 90 is an opening 92 around which extends an outwardly extending flange 94 formed of the material of the plate 90. At the inside of the plate 90 is provided a screening material 96 having an opening 98 therethrough.

Located exteriorly of the plate 90 is a window frame 100 which is hinged to the plate 90 as indicated at 102. The window frame 100 carries a glass or other transparent window element 104. Preferably located centrally of the window frame 100 is a bar 106 to which is extended an arcuate supporting strut 108 which passes through the opening 98 formed in the screen. The supporting strut 108 is provided with a plurality of locating notches 110, any one of which may be engaged with a pin or the like 112 carried by a cross member 114 located inside the screen 96. Obviously, the supporting strut may be located centrally of the window if desired, in which case the bar 106 will be located centrally of the window, or the bar 106 may be located at either side of the window frame. In the case of a small window opening the latter arrangement is preferable. However, if a relatively large window is employed it may be desirable to expand the window into two lights, in which case the bar 106 and strut 108 will preferably be located between the ends thereof.

The eave 84 serves to direct drainage away from the window opening. However, any moisture which enters the channels 74 and 80 eventually finds its way out through the openings 78 provided in the bottom channel 74.

Referring now to Figures 11 through 18, the basic structure of the cabin will be described. The framework for the cabin is made up essentially of tubular supporting elements which are extendable and extend in crossing relation, as seen in Figures 11 and 12. These supporting elements comprise rafter span extending side posts indicated generally at 120, ridge extending and bracing end posts indicated generally at 122, ridge member indicated generally at 124, and inclined supporting rafters or rafter spans indicated generally at 126. The end post structure indicated generally at 122 includes a hinged brace member indicated generally at 128.

The lower ends of the posts 120 and 122 are each located in receptor stations or withholding sleeves comprising essentially socket members 130 which are secured to the floor 132 of the fabric enclosure 10.

Referring now to Figures 13 and 14, each of these receptor stations comprises a tubular metal socket 130 open at its bottom and which includes a supporting flange 134. These receptor stations are located at the interior corners of the fabric enclosure 10 and are preferably permanently secured in position thereat by means of leather supports 136 sewed or otherwise secured to the canvas floor 132. The sockets 130 are open ended so that the lower ends of the vertical posts may pass completely therethrough as best indicated in Figure 13. The vertical posts 120 and 122 each comprise a lower tubular member 140 of a size to extend through the socket 130. The tubular members 140 are provided with a plurality of pairs of through openings 142 for the reception of a locating pin 144, the function of which will subsequently be described. The upper ends of the tubular members 140 are slidably received in enlarged tubular sleeves 146 into the upper ends of which extend the lower ends of tubular members 148 which constitute portions of the side posts. Received within the sleeve 146 is a compression spring 150 which at its upper end seats against the lower end of the tubular member 148, and which at its lower end seats against the upper end of the tubular member 140. In order to prevent complete separation between tubular member 140 and the sleeve 146 a tie member 152 is provided which is hooked over a transverse element 154 at its upper end and which at its lower end is engaged by a clevis pin 156 which extends through cooperating pairs of openings provided in the sleeve 146 and the tubular member 140. This arrangement permits relative downward telescoping movement of the tubular member 148 relative to the tubular member 140 and the sleeve 146. In use, the tubular member 140 and the sleeve 146 are retained against telescoping movement by the clevis pin 156.

Preferably, the lower ends of the tubular members 140 are provided with rubber tips 158.

Referring now to Figure 11 the end post indicated generally at 122 is made up of the tubular member 140, the sleeve 146, tubular member 148, and a relatively larger tubular member 160 into which the upper end of the tubular member 148 is telescopically received. In order to provide telescopic adjustment between tubular members 148 and 160 a clamping device indicated generally at 162 is provided. The clamping device comprises essentially a collar 164 carrying a set screw 166 adapted to extend through a suitable opening provided in the tubular member 160 and engage in clamping relation with the tubular member 148. Thus by loosening the set screw 166 the required telescopic adjustment between tubular members 148 and 160 may be effected, after which the parts may be clamped in adjusted position. At the same time when the cabin is disassembled, the tubular member 148 may be telescoped substantially completely within the tubular member 160 and locked in position by the set screw 166, thus reducing dimensions of the parts for storage and transit.

The upper end of the end post structure includes a transverse brace member 170 which is hinged to the tubular member 160 at a point adjacent to but spaced from the upper end of the latter, as indicated at 172. For this purpose the outer end of the brace member 170 is provided with a pair of ears indicated generally at 174. Above the hinge 172 the tubular member 160 is illustrated as extending upwardly and outwardly at 176, thus providing an upper open end for the reception of a supporting hook 178 sewed or otherwise secured to the interior surface of the fabric closure 10. The inner end of the brace member 170 slidably receives a tubular extension 180 which has telescopic relation with respect to the member 170 and which may be clamped in adjusted position by a clamp screw 182 carried by a sleeve 184 secured to the inner end of the member 170.

In order to retain the hinged brace member 170 in proper position relative to tubular member 160, there is provided a strut 186 which is pivoted as indicated at 188 to a sleeve 190 secured to the brace member 170. Slidably mounted on the tubular member 160 for vertical adjustment is a sleeve 192 having a set screw 194 carried thereby by means of which the sleeve may be secured in adjusted position on the tubular member 160. The lower end of the strut 186 is notched as illustrated in Figure 11 to engage a transverse pin 196 carried between a pair of ears 198 on the sleeve 192. The arrangement permits supporting of the brace member 170 in adjusted position by engaging the notch in the strut 186 with the transverse pin 196, and sliding the sleeve 192 upwardly to thus swing the brace member 170 to its proper position, after which the set screw 194 is tightened.

Referring now to Figure 12 the detailed construction of the side posts 120 is illustrated. These posts at their lower ends comprise tubular members 140 which are slidable in the sleeves 146 as previously described. Associated with the sleeve 146 in spring pressed telescopic relation therewith is the tubular member 148 previously described. It will be appreciated that the members 140, 146, and 148 are identical for both the side and end post constructions. At the upper end of the tubular member 148 is an enlarged tubular member 200 which is provided at its lower end with a collar 202 carrying a clamping set screw 204. This arrangement permits the tubular member 148 to be telescoped within the tubular member 200 when the structure is disassembled. At its upper end the tubular member 200 is provided with a pivot lock or hinged interlocking device 206 which is illustrated in detail in Figures 16 and 17. As seen in these figures, the device 206 comprises a sleeve portion 208 received over the upper end of the tubular member 200. At its upper end the device 206 is provided with a pair of spaced ears 210 provided with a transverse pivot pin 212. Adjacent its lower end the device 206 is provided with an offset shoulder structure 214 which carries a clamping screw 216.

The rafter structure indicated generally at 126 includes a tubular member 218 which is bent as indicated at 220 to define the eave line of the cabin structure. The lower end of the member 218, as best seen in Figure 16, is provided with a transverse slot 222 which is closed at both ends and which thus prevents separation between the hinged member 218 and the tubular member 200. In the assembled relation illustrated in Figure 16 it will be observed that the lower end 224 of the member 218 is nested within tubular member 200 and the parts are thus firmly supported in the position shown. Tubular member 200 includes an opening through which the threaded end of the screw 216 extends so that the parts may be clamped in assembled relation thus forming a rigid raftered arch with extendable side bracing post members as is best shown in Figure 12.

The parts are so related that upon release of the clamping screw 216, the hinged member 218 may be moved upwardly until its lower end is above the upper end of the tubular member 200, at which time member 218 with the rafter spans 126 may be swung as a unit about the pin 212 as shown in Figure 21. This is a useful construction and contributes to the compactness with which the disassembled structure may be stored.

The rafter structure 126 includes an enlarged tubular member 226 into the lower end of which the upper end of tubular member 218 extends with a press fit. The member 226 at its upper or inner end carries a collar 228 provided with a clamping screw 230. A tubular member 232 is slidably received within the upper inner end of tubular member 226 and may be clamped in proper position by tightening the screw 230.

The structure by means of which the rafter members and the hinged brace members are interconnected to provide an adjustable rigid supporting structure, is best illustrated in Figure 15.

The ridge member 124 comprises an enlarged tubular member 240 having a collar 242 adjacent one end provided with a clamping screw 244. Telescopically received within one end of the tubular member 240 is a smaller tubular member 246. The other end of the tubular member 246 is received within a second larger tubular member 248. Tubular members 240, 246, and 248 together constitute an elongated bar assembly which forms the ridge member 124.

In order to provide a connection between the ridge member 124, the rafters 126, and the hinged brace members 128, the construction best illustrated in Figure 15 is provided. Extending between the upper end of tubular members 232 is a tubular member 250 which is also well illustrated in Figure 12. The tubular member 250 is bent at its ends as illustrated and is adapted to receive the upper ends of the smaller tubular members 232. To provide a cross connection between the parts a pair of cross connector elements 252 are provided, each having a tubular portion 254 and a split end, the split portions 256 being spaced apart to extend at substantially 90 degrees to the tubular portion 254. It will be appreciated that the pair of cross connection elements 252 when placed in the relationship illustrated in Figure 15 define a generally tubular socket or recess by virtue of the four laterally extending split portions 256. In the cross connection these split portions 256 are assembled about the tubular member 250 and are retained in assembled relation thereon by a pair of clamps 258 each provided with a clamping screw 260. One of the elements 252 cooperates with the upper end of the tubular member 180 best seen in Figure 11, and as seen in this figure, the tubular portion of the other element 252 receives the tubular member 240 or 248 depending upon its position in the assembly.

Attention is directed to the fact that the fabric enclosure 10 is tensioned as the framework is erected and expanded into the assembled position shown in Figures 11 and 12. Moreover, the side walls of the fabric may be further tensioned by the application of pressure to the supporting structure for the tubular sockets 130 and after the required amount of pressure has been applied, the pin 144 may be extended through the appropriate openings 142. At the same time it will be observed that the effective force exerted by the spring 150 will tend to urge the upper portions of the side and end posts upwardly so as to maintain the fabric of the structure under tension and also to relieve stresses due to possible shrinkage of the fabric.

A further feature of the present invention resides in the fact that the cabin structure may be maintained substantially level even though it is erected upon uneven ground, by the simple expedient of changing the position of the pins 144 and extending the tubular members 140 a greater or lesser distance depending upon the contour of the ground.

A better understanding of the manner in which the structure operates to produce a rigid self sustaining cabin may be had by describing the manner in which the structure is erected. It will be recalled that the canvas enclosure 10 is tailored to fit the inner supporting structure or framework. Preferably, the fabric cover includes a sewed-in floor cloth which preferably is made to fit slightly loose. In order to erect the structure a person enters the collapsed fabric cover through the door opening 16, carrying the rafters 126 and associated side posts 120, with the parts in folded or collapsed condition. The hinged tubular members 218 are then swung out and tubular members 226 of the rafters 126, are forced down into telescoping engagement with the hinged tubular members 218. This assembly of a rafter with its associated side supporting posts produces a rigid arch. The first of these is assembled into the respective tubular sockets 130, after which by an outwardly opening telescoping adjustment of the post elements, the cabin structure is raised up to about its normal height. Following this the second rafter and associated posts are assembled in a similar manner with the lower ends of the posts seated in the tubular sockets 130 and the arch thus provided extended to approximately its desired height by outwardly relative telescopic movement of the elements making up the posts. The ridge member indicated generally at 124 is next connected to the arches by inserting the ends of the tubular members 240 and 248 in the sockets provided therefor by the tubular portions 254 of the cross connector elements 252. One of the end posts including its hinged brace member 170 and associated parts, is next set up with its lower end located in the proper socket member 130 and with its upper end receiving the hook 178 provided on the inner surface of the fabric enclosure 10. This post is now adjusted outwardly to the cabin's normal height, thus supporting the fabric enclosure at what becomes the eave line of the assembled structure. Thereafter tubular extension 180 is connected into the adjacent socket of the cross connector device 252 in line with and opposite the ridge member. A similar operation is performed at the opposite end of the cabin. Thereafter the upper telescoping members are moved outwardly to put a tension on the upper part of the fabric enclosure. Next the tubular sockets 130 which are included in the tubular floor stations provided adjacent the corners of the floor, are forced downwardly on their respective posts so as to create a slight tension on the fabric up and down, and the pins 144 are inserted in the appropriate one of the pairs of openings 142 to maintain the desired tension on the structure.

The structure is now completely set up except for final adjustment at points where needed to equalize pressure and to tension the fabric cover the desired amount. The notched ends of the struts 186 are engaged with the pins 196 and the collars 192 adjusted upwardly to effect a bracing action of the framework.

Some of the posts may protrude downwardly below the tubular sockets 130 but on level ground these sockets will all be setting firmly on the supporting surface.

When assembled as described in the foregoing the cabin may be carried from place to place as it can be lifted clear of the ground and still retain its normal shape. If desired however, the cabin may be anchored to the ground by suitable pins similar to tent pins as will be readily understood.

It will be observed that the generally vertical supporting posts all are inclined inwardly which results in a more stable structure.

In general, it will be observed that the framework is expansible both vertically and laterally outwardly at its top. When the framework is assembled and expanded as described the fabric cover or enclosure is thus under tension. The combination of a fabric enclosure under tension and a rigid supporting framework thus placed under compression results in a very strong and stable structure.

Referring now to Figure 19 there is illustrated generally at 300 a modified form of cabin composed generally of equivalent parts. In this construction an eight-sided cabin is produced and the figure is presented merely to illustrate the flexibility of design which the present construction permits.

Referring now to Figure 20 there is illustrated generally at 310 a different design of cabin structure which like the cabin of Figure 19, is made up of the same component parts as are embodied in making the embodiment of the invention illustrated in the preceding figures.

Since Figures 19 and 20 merely illustrate different designs of cabins which may be assembled from parts described in detail in conjunction with the preceding figures, the construction of these designs will not be described in detail.

While reference is made herein to the use of tubular members, and while I prefer to use tubular members due to their lightness as compared to their strength, it will be readily apparent that except where a telescoping arrangement requires that one part be tubular, solid members may be employed. Thus, parts such as 148 or 250 may be solid metal, wood, or other material. Moreover, members such as 200 may be composite members having a solid main portion and tubular sockets at their ends, although this precludes the desirable collapsibility of the frame.

The drawings and the foregoing specification constitute a description of the improved cabin in such full, clear, concise and exact terms as to enable any person skilled in the art to practice the invention, the scope of which is indicated by the appended claims.

What I claim as my invention is:

1. In a cabin structure of the character set forth, a cross connector device for connecting the ends of two cylindrical members to an intermediate portion of a third cylindrical member comprising a pair of tubular parts each split longitudinally at one end, with the split semi-cylindrical portions of each part extending laterally outwardly with respect to the axis thereof, the split portions of said parts being assembled around one of the cylindrical members with the split portions of one part respectively opposite the split portions of the other part, and clamping sleeves assembled over said split portions to lock said tubular parts on said one cylindrical member.

2. Cabin structure comprising a frame, said frame including generally vertical posts, each of said posts having a tubular, open upper end and spaced ears extending therebeyond, a pivot pin spanning said ears of each post, rafter members having ends respectively telescoping within the open ends of said posts, a slot adjacent to the end of each of said members through which said pins respectively extend, each of said slots being closed at both ends and extending close enough to the ends of said members to permit withdrawal of the ends of the latter from the open ends of said respective posts, and a fabric enclosure for said frame.

3. The structure defined in claim 2 comprising a clamping screw carried by said posts engageable with the ends of said member when the latter are inserted in the open ends of said respective posts.

4. In a cabin structure of the character set forth, a cross connector device for connecting the ends of two elongated members to an intermediate portion of a third elongated member, comprising a pair of parts respectively secured to the ends of said two members, each part having a pair of portions extending in opposite directions laterally outwardly of the member to which it is secured, said portions being assembled around the intermediate portion of said third member with the portions of one part respectively opposite the portions of the other part, and clamping sleeves assembled over the portions of said parts to lock the same on the intermediate portion of said third member.

5. The structure set forth in claim 4, in which said intermediate portion is cylindrical and in which the portions of said parts are shaped to conform to the contour of said intermediate portion.

6. Cabin structure comprising a frame composed essentially of cylindrical elements, said frame including generally vertical posts, members carried by and extending inwardly from the top of each of said posts, a fabric enclosure for said frame, each of said posts and members being longitudinally adjustable as to length to tension said enclosure, and cooperating sets of hook elements and hook supporting elements, said hook elements being secured to the interior of the fabric enclosure adjacent the eave line thereof, and the upper ends of said vertical posts being recessed to form the supporting elements for said hooks.

7. Cabin structure comprising a frame, said frame including generally vertical posts, members carried by and extending inwardly from the top of each of said posts, a fabric enclosure for said frame, and cooperating sets of hook elements and hook supporting elements, said hook elements being secured to the interior of the fabric enclosure adjacent the eave line thereof, and the upper ends of said vertical posts being recessed to form the supporting elements for said hooks.

8. Cabin structure comprising a frame composed essentially of cylindrical elements, said frame including generally vertical posts, and members carried by and extending inwardly from the top of each of said posts, a fabric enclosure for said frame, each of said posts and members being longitudinally adjustable as to length to tension said enclosure, said enclosure including a floor having sockets open to permit passage therethrough of the lower ends of said posts, and abutment means for holding said sockets against upward movement on said posts, said sockets comprising tubular members open at both ends and registering openings in said floor, each of said tubular members having a supporting flange thereon secured to said floor, said abutment means including locating pins, and openings in said posts adjacent the lower ends thereof adapted to receive said pins, said pins being adapted to bear against the upper ends of said tubular members and thereby hold said sockets against upward movement on said posts.

9. Cabin structure comprising a frame, said frame including generally vertical posts, and members carried by and extending inwardly from the top of each of said posts, a fabric enclosure for said frame, said enclosure including a floor having sockets open to permit passage therethrough of the lower ends of said posts, and abutment means for holding said sockets against upward movement on said posts, said sockets comprising tubular members open at both ends and registering openings in said floor, each of said tubular members having a supporting flange thereon secured to said floor, said abutment means including locating pins, and openings in said posts adjacent the lower ends thereof adapted to receive said pins, said pins being adapted to bear against the upper ends of said tubular members and thereby hold said sockets against upward movement on said posts.

10. Cabin structure comprising a frame including generally vertical posts, and members carried by and extending inwardly from the top of each of said posts, a fabric enclosure for said frame, said enclosure including a floor having sockets about the periphery of the floor, said sockets comprising tubular members opening at both ends to permit passage therethrough of the lower ends of said posts, and abutment means for holding said sockets against upward movement on said posts, said abutment means including locating pins, and openings in said posts adjacent the lower ends thereof adapted to receive said pins, said pins being adapted to bear against the upper ends of said tubular members and thereby hold said sockets against upward movement on said posts.

11. Structure as defined in claim 10, in which the openings in said posts are arranged in spaced relation longitudinally of the posts.

12. Cabin structure comprising a frame including generally vertical side posts defining opposite sides of said frame, rafters extending transversely inwardly of said frame and being carried by the tops of said respective side posts on opposite sides of said frame, releasable means holding said rafters and side posts in fixed angular relation, generally vertical end posts defining opposite ends of said frame, braces having the outer ends pivotally connected to said respective end posts at points spaced below the tops of the latter for vertical swinging movement and extending inwardly of said frame from the points of pivotal connection, means interconnecting said rafters and braces, a fabric enclosure for said frame having a top portion and side and end portions respectively overlying corresponding portions of said frame, said enclosure including a floor portion extending across and secured to the lower edges of the side and end portions of said enclosure, said floor portion having adjacent its periphery a plurality of sockets open to permit passage therethrough of the lower ends of said side and end posts, and abutment means on said side and end posts for holding said sockets against upward movement thereon, the tops of said end posts being engageable with said enclosure and cooperable with said abutment means to maintain said enclosure under tension, and said side and end posts being adjustable as to length to vary the tension on said enclosure.

References Cited in the file of this patent

UNITED STATES PATENTS

| | | |
|---|---|---|
| 557,035 | Smith | Mar. 24, 1896 |
| 1,150,781 | Louden | Aug. 17, 1915 |
| 1,546,613 | Beman | July 21, 1925 |
| 1,572,939 | Leffert | Feb. 16, 1926 |
| 1,583,832 | Hoigaard | May 11, 1926 |
| 1,633,820 | Long et al. | June 28, 1927 |
| 1,704,945 | Leffert | Mar. 12, 1929 |
| 1,707,960 | Gilkison | Apr. 2, 1929 |
| 1,720,132 | Kuhn | July 9, 1929 |
| 1,962,916 | Smith | June 12, 1934 |
| 2,044,351 | Eriksson | June 16, 1936 |
| 2,168,913 | Middleton | Aug. 8, 1939 |
| 2,182,283 | Curtis | Dec. 5, 1939 |
| 2,185,629 | Dixon | Jan. 2, 1940 |
| 2,188,747 | Bittick | Jan. 30, 1940 |
| 2,232,306 | Baldwin | Feb. 18, 1941 |
| 2,530,765 | Greenup | Nov. 21, 1950 |
| 2,555,220 | Brown | May 29, 1951 |